No. 854,715. PATENTED MAY 28, 1907.
J. G. CALLAN & R. H. RICE.
COMBINED COUPLING AND BEARING.
APPLICATION FILED OCT. 26, 1905.
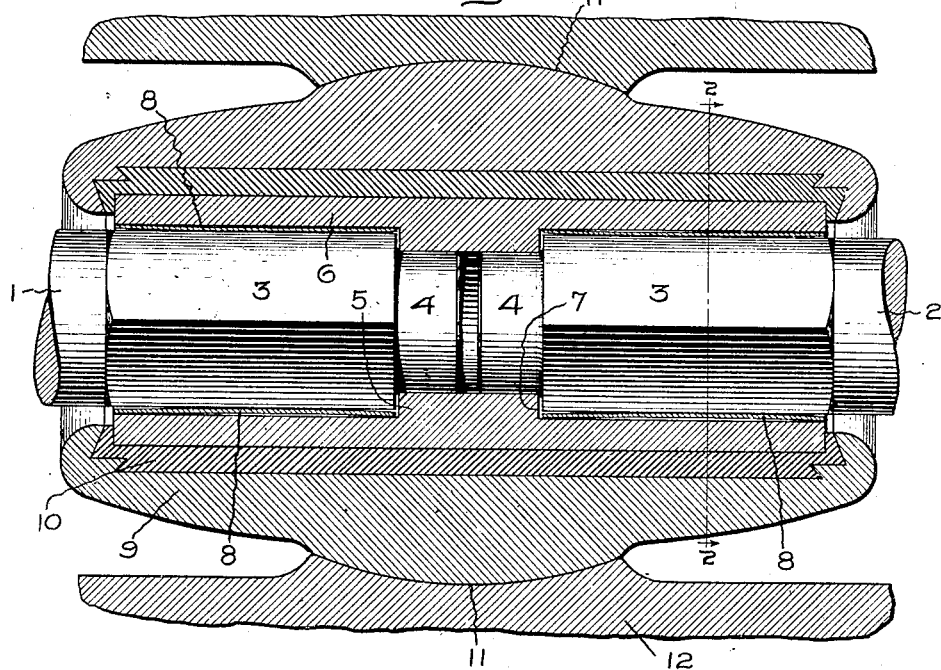
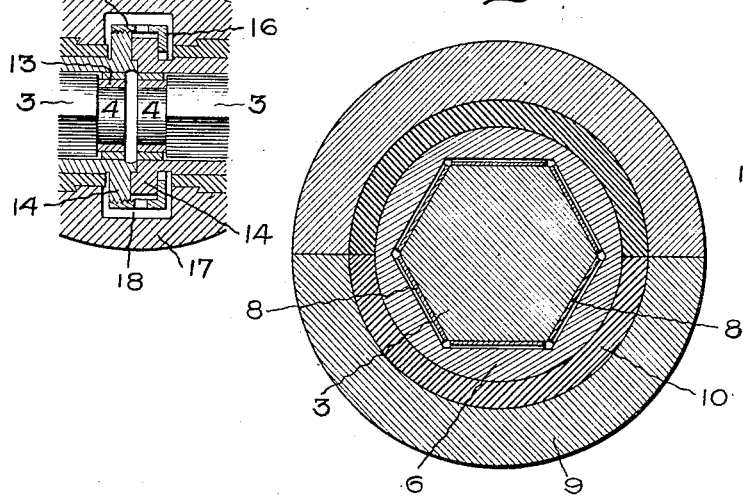
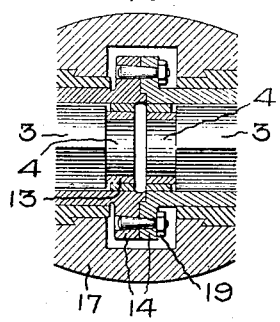
Witnesses:
Marcus L. Byng.
Benjamin B. Hull
Inventors,
Richard H. Rice,
John G. Callan
By Albert G. Davis
Atty.

UNITED STATES PATENT OFFICE.

JOHN G. CALLAN, OF LYNN, AND RICHARD H. RICE, OF SWAMPSCOTT, MASSACHUSETTS, ASSIGNORS TO GENERAL ELECTRIC COMPANY, A CORPORATION OF NEW YORK.

COMBINED COUPLING AND BEARING.

No. 854,715.     Specification of Letters Patent.     Patented May 28, 1907.

Application filed October 26, 1905. Serial No. 284,510.

*To all whom it may concern:*

Be it known that we, JOHN G. CALLAN and RICHARD H. RICE, citizens of the United States, residing at Lynn, county of Essex, State of Massachusetts, and Swampscott, county of Essex, State of Massachusetts, respectively, have invented certain new and useful Improvements in Combined Couplings and Bearings, of which the following is a specification.

This invention relates to shaft couplings, and its object is to provide a combined bearing and coupling which will allow some play to the parts so that the device partakes to a certain extent of the nature of a universal joint.

The invention is capable of general use, but it has been especially designed for coupling the shaft of a horizontal steam turbine to the armature shaft of an electric generator.

It consists in part of a sleeve having a polygonal interior to receive and couple the abutting ends of the two shafts which are provided with polygonal portions to fit loosely in said sleeve. Resilient elements, such as flat springs, are interposed between the faces of the sleeve and the shafts. The exterior of the sleeve is cylindrical, so that it can revolve in a babbitt-lined bearing, which preferably has external spherical supporting surfaces in order to give it freedom of movement in the pedestal.

In the accompanying drawing, Figure 1 is a longitudinal section and Fig. 2 a cross section on the line 2—2, Fig. 1, of a combined coupling and bearing embodying our invention. Figs. 3 and 4 show modifications.

Referring first to Figs. 1 and 2, the two shafts 1, 2, are placed substantially in line, each having a polygonal portion 3 and preferably a cylindrical tip 4. The two tips fit easily into a central reduced portion 5, of the sleeve 6, but do not quite abut, being prevented from so doing by shoulders 7 at the ends of the portion 5 which engage with the inner ends of the polygonal portions of the shafts. From the shoulders 7 to its ends, the interior of the sleeve is polygonal, fitting the similar portions of the shafts with considerable play. Yielding means are provided for taking up this play, preferably flat springs 8, inserted between the faces of the shaft and the sleeve. These tend to center the shafts in the sleeve, but permit them to yield laterally in every direction to a certain limited extent: the construction constituting in effect a universal joint.

The exterior of the sleeve is cylindrical so that it can rotate in a brass 9, made in halves and lined with babbitt 10. On each half is a spherical enlargement 11 which is received in a spherical socket in the fixed pedestal or other support 12. This ball-and-socket bearing, in connection with the play of the shafts and the sleeve, affords perfect flexibility of movement for the two shafts within sufficient limits for all practical purposes.

Fig. 3 shows a slight modification, in which the central reduced portion 5 of the sleeve is omitted, the ends of the shafts being surrounded by bushings 13. The sleeve is made in two parts, meeting on a transverse plane substantially coincident with the space between the adjacent ends of the two shafts. Each part has a circumferential flange 14, and the two flanges are fastened together by a union 15 which is screw-threaded internally to engage screw threads on the flange on one part, and has a flange 16 to engage with the flange on the other part. The brass 17 has an internal circumferential groove 18 to permit the flanged sleeve to revolve.

Fig. 4 shows a similar structure in which the flanges 14 are fastened together by tapered bolts 19 in place of the union 15.

What I claim as new, and desire to secure by Letters Patent of the United States, is,—

1. A combined shaft-coupling and bearing, comprising a sleeve having a polygonal interior and cylindrical exterior, shafts having polygonal portions fitting loosely in said sleeve, and yielding means for taking up the play between said parts.

2. A combined shaft-coupling and bearing, comprising a sleeve having a polygonal interior and cylindrical exterior, shafts having polygonal portions fitting loosely in said sleeve, and yielding means for taking up the play between said parts, comprising flat springs interposed between the faces of said parts.

3. A combined-shaft-coupling and bearing, comprising a sleeve having a polygonal interior and cylindrical exterior, shafts having polygonal portions fitting loosely in said sleeve, yielding means for taking up the play between said parts, and a brass in which said sleeve can rotate.

4. A combined shaft-coupling and bearing, comprising a sleeve having a polygonal interior and cylindrical exterior, shafts having polygonal portions fitting loosely in said sleeve, yielding means for taking up the play between said parts, and a brass in which said sleeve can rotate, said brass having a ball-and-socket bearing.

5. The combination with two shafts having polygonal portions, of a sleeve having a polygonal interior and a cylindrical exterior and composed of two parts having abutting flanges intermediate of said cylindrical portion, means for fastening said flanges together, and a brass extending on each side of said flanges.

6. The combination with two shafts having polygonal portions, of a sleeve having a polygonal interior and a cylindrical exterior and composed of two parts having abutting flanges, means for fastening said flanges together, and a brass having a cylindrical interior and an internal circumferential groove.

In witness whereof, we have hereunto set our hands this twenty-first day of October, 1905.

JOHN G. CALLAN.
RICHARD H. RICE.

Witnesses:
JOHN A. McMANUS, Jr.,
ALEXANDER M. GILBERT.